United States Patent [19]
Kim

[11] Patent Number: 5,805,668
[45] Date of Patent: Sep. 8, 1998

[54] ELECTRONIC SWITCHING SYSTEM FOR TESTING THE STATUS OF SUBSCRIBER COMPONENTS CONTAINED THEREIN

[75] Inventor: Jae-Peoung Kim, Incheon, Rep. of Korea

[73] Assignee: Daewoo Telecom, Ltd., Incheon, Rep. of Korea

[21] Appl. No.: 656,534

[22] Filed: May 31, 1996

[30] Foreign Application Priority Data

May 31, 1995 [KR] Rep. of Korea ................. 95-14376

[51] Int. Cl.⁶ .................................................. H04M 1/24
[52] U.S. Cl. ................................ 379/9; 379/1; 379/10; 379/15; 379/29; 370/244; 370/250
[58] Field of Search .................................. 379/1, 5, 9–10, 379/12, 14–16, 29, 34, 22; 370/241–242, 244, 249, 250–251

[56] References Cited

U.S. PATENT DOCUMENTS 5,684,868  11/1997  Alexander ................................. 379/34

Primary Examiner—Curtis A. Kuntz
Assistant Examiner—Duc Nguyen

[57] ABSTRACT

A novel system includes a first interfacing unit connected to a sending subscriber for converting analog subscriber information transmitted from the sending subscriber via a first subscriber line to digital subscriber information to provide it to a first transmission line; a second interfacing unit connected to its corresponding receiving subscriber for reconverting the digital subscriber information on the first transmission line to the original analog subscriber information to transmit the same to the corresponding receiving subscriber via a second subscriber line; a switching module coupled between the first and the second interfacing units for switching the digital subscriber information on the first transmission line to the second interfacing unit; and a testing unit connected to the switching module, if the remaining components within the system excepting the first and the second subscriber interfacing units are all normal, for testing the status of each of a set of subscriber components to provide information representing the status thereof wherein the set of subscriber components includes the first and the second subscriber interfacing units, and the first and the second subscriber lines.

3 Claims, 3 Drawing Sheets

ELECTRONIC SWITCHING SYSTEM FOR TESTING THE STATUS OF SUBSCRIBER COMPONENTS CONTAINED THEREIN

FIELD OF THE INVENTION

The present invention relates to an electronic switching system; and, more particularly, to an improved system which is capable of effectively testing the status of a set of subscriber components such as a plurality of subscriber interfacing units contained in the system, and a plurality of subscriber lines connected thereto.

BACKGROUND OF THE INVENTION

As is well known, an electronic switching system (ESS) serves to select and connect two assigned subscribers among a great number of subscribers so as to communicate information therebetween.

The ESS basically includes a multiplicity of access switching subsystems (ASS's), an interconnection network subsystem (INS) and a central control subsystem (CCS). Each ASS includes a plurality of subscriber interfacing units and a time division switching unit to communicate information between two subscribers, i.e., a sending subscriber and a receiving subscriber, selected from a plurality of subscribers. When the two selected subscribers are coupled to an ASS, they are connected within the same ASS. On the other hand, when the two selected subscribers are coupled to two different ASS's, then they are interfaced to the INS and connected within the INS. The INS, coupled with each of the ASS's and the CSS, includes a central data link module and a space division switching unit and connects the two selected subscribers. Finally, the CCS coupled with the ASS's and the INS serves to perform a series of operation and maintenance processes of the ESS.

In the ESS, on the other hand, each ASS further includes a test equipment control (TEC) unit for testing the status of a set of subscriber components such as a plurality of subscriber interfacing units within said each ASS, and a plurality of subscriber lines connected thereto under the control of the CCS. As is well known in the art, a TEC unit within an ASS, e.g., a first ASS, is also capable of testing the status of a set of subscriber components contained in another ASS, e.g., a second ASS. Specifically, to test the status of each subscriber component included in the set of the second ASS, test-pattern data with a predetermined bit length from the TEC unit of the first ASS is transmitted via a time division switching unit in the first ASS, the INS and then a time division switching unit of the second ASS to said each subscriber component included in the set of the second ASS. Thereafter, the test-pattern data from said each subscriber component included in the set of the second ASS is returned back to the TEC unit of the first ASS through the time division switching unit of the second ASS, the INS and the time division switching unit of the first ASS. Finally, the TEC unit of the first ASS compares the original test-pattern data with the returned test-pattern data to determine whether said each subscriber component included in the set of the second ASS is normal or erroneous, wherein said each subscriber component of the set of the second ASS is regarded as normal if the original test-pattern data is equal to the returned test-pattern data, and erroneous if otherwise.

Such a subscriber component status testing technique can be efficiently employed only if the two subscribers are not communicated with each other or other subscribers and the remaining components within the ESS other than the plurality of subscriber components to be tested are all normal, wherein a common control memory & maintenance board assembly included in a time division switching unit of each ASS and the CCS may be utilized to test the status of all the remaining components. Through such maintenance and testing processes, communication of information between the two connected subscribers can be continued.

However, in the conventional subscriber component status testing technique, when a TEC unit within an ASS tests the status of each subscriber component contained in another ASS, a time division switching unit within the former ASS exclusively designates one input subhighway thereof for receiving a returned test-pattern data instead of carrying information generated from a predetermined number of subscribers. This may result in a reduction of the total number of subscribers to accommodate in the ESS system.

SUMMARY OF THE INVENTION

It is, therefore, a primary object of the present invention to provide an improved system which is capable of effectively testing the status of a set of subscriber elements such as a plurality of subscriber interfacing units contained in the system, and a plurality of subscriber lines connected thereto, thereby improving the performance of the system.

In accordance with the invention, there is provided an improved electronic switching system (ESS) for connecting a sending subscriber and its corresponding receiving subscriber among a plural number of subscribers, which comprises:

first interfacing means connected to the sending subscriber for converting analog subscriber information transmitted from the sending subscriber via a first subscriber line to digital subscriber information to provide it to a first transmission line;

second interfacing means connected to the corresponding receiving subscriber for reconverting the digital subscriber information on the first transmission line to the original analog subscriber information to transmit the same to the corresponding receiving subscriber via a second subscriber line;

switching means coupled between the first and the second interfacing means for switching the digital subscriber information on the first transmission line to the second interfacing means; and testing means connected to the switching means, if the remaining components within the system excepting the first and the second subscriber interfacing units are all normal, for testing the status of each of a set of subscriber components to provide information representing the status thereof wherein the set of subscriber components is the first and the second subscriber interfacing means, and the first and the second subscriber lines.

BRIEF DESCRIPTION OF THE DRAWING

The above and other objects and features of the present invention will become apparent from the following description of preferred embodiments with reference to the accompanying drawings, in which.

DETAILED DESCRIPTION OF THE PREFERRED EMBODIMENTS

Figure 1:
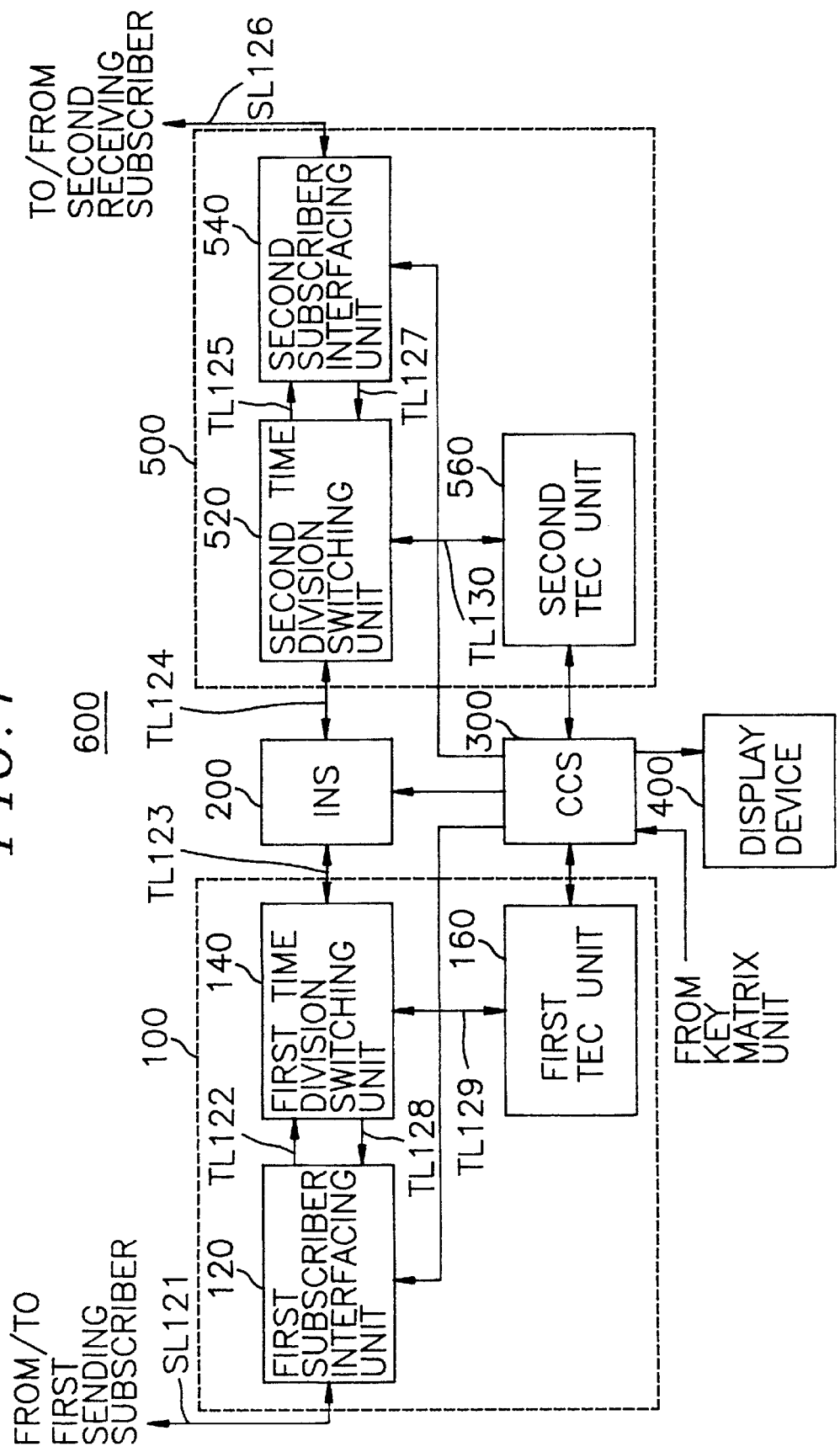
FIG. 1 is a block diagram illustrating a novel ESS in accordance with the present invention.

Referring to FIG. 1, there is provided a block diagram of a novel ESS 600 of the present invention capable of testing the status of each of a set of subscriber components such as a plurality of subscriber interfacing units contained in the ESS 600 and a plurality of subscriber lines connected thereto. The inventive ESS 600 comprises first and second ASSs 100 and 500, an INS 200, a CCS 300 and a display device 400. Each of the first and the second ASSs 100 and 500, as is well known in the art, serves to interface a plurality of subscribers (not shown) with the INS 200.

As illustrated in FIG. 1, one of the plurality of subscribers, e.g., a first sending subscriber, is coupled via its corresponding subscriber line SL121 with the first ASS 100 which includes a first subscriber interfacing unit 120, a first time division switching unit 140 and a first test equipment control (TEC) unit 160. And, one receiving subscriber, e.g., a second receiving subscriber, is connected through its corresponding subscriber line SL126 to the second ASS 500 which also includes a second time division switching unit 520, a second subscriber interfacing unit 540 and a second TEC unit 560. For the purpose of simplicity, the inventive system will be described with respect to two subscribers, i.e., the first sending subscriber and the second receiving subscriber from now on.

When the first sending subscriber connected to the first ASS 100 calls the second receiving subscriber coupled to the second ASS 500, analog subscriber information is transmitted from the first sending subscriber through the first subscriber line SL121 to the first subscriber interfacing unit 120.

The first subscriber interfacing unit 120 interfaces the first sending subscriber with the first time division switching unit 140 by using a conventional interfacing mode well known in the art. That is, at the first subscriber interfacing unit 120, the analog subscriber information is converted into digital subscriber information represented by pulse code modulation (PCM) data with a predetermined bit length. The digital subscriber information is then fed via its corresponding transmission line TL122 to the first time division switching unit 140.

The first time division switching unit 140 serves to switch the digital subscriber information on the transmission line TL122 to a corresponding transmission line TL123 connected with the INS 200 by using one of conventional time division switching techniques.

Figure 2:
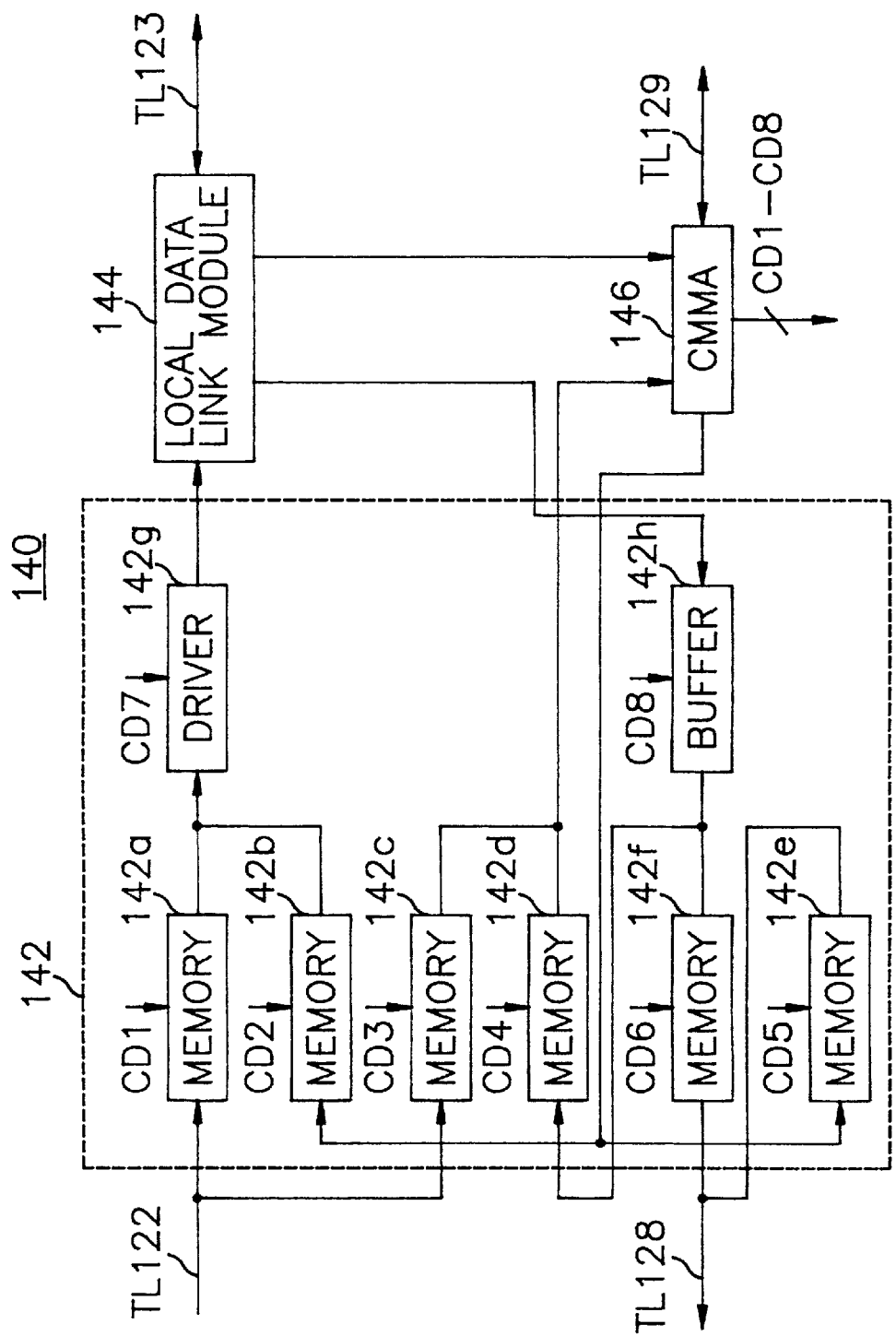
FIG. 2 presents a detailed block diagram of the first time division switching unit shown in FIG. 1.

Referring to FIG. 2, there is depicted a detailed block diagram of the first time division switching unit 140 shown in FIG. 1. The first time division switching unit 140 includes a time slot interchanging (TSI) module 142, a local data link (LDL) module 144 and a common control memory & maintenance board assembly (CMMA) 146, the TSI module 142 having six memories 142a to 142f, a driver 142g and a buffer 142h.

One of the six memories 142a to 142f, e.g., 142a, is used to store the digital subscriber information supplied through the transmission line TL122 to delay it for a predetermined time period. On the other hand, the remaining five memories, i.e., 142b to 142f, of the six memories are utilized to store and delay test-pattern data TPD with a predetermined bit length, e.g., 8-bit, to be used to test the status of each of the set of subscriber components, provided from the first TEC unit 160 or the second TEC unit 560. A description to test the status of each of the set of subscriber components will be provided in detail with reference to FIGS. 1 to 3 hereinafter.

The CMMA 146 serves to control the operation of each of the six memories 142a to 142f, the driver 142g and the buffer 142h in response to each of eight control data, CD1 to CD8, which have been derived by using a system clock (CLK) signal from the LDL module 144 and prestored in a control memory (not shown) thereof, and executes a maintenance for all the components included in the first time division switching unit 140.

Specifically, to communicate information between the first sending subscriber and the second receiving subscriber, the digital subscriber information on the transmission line TL122 is applied to the first memory 142a for its storage and delay. In response to the first control data CD1 from the control memory of the CMMA, the digital subscriber information stored in the first memory 142a is retrieved and relayed to the driver 142h. The driver 142h temporarily latches the digital subscriber information from the first memory 142a and outputs, in response to the eighth control data CD8 from the control memory, the latched digital subscriber information to transmit the same to the LDL module 144.

At the LDL module 144, which may be implemented with an optical cable and a signal converter (not shown), an electronic signal of the digital subscriber information is converted to a light signal to efficiently transmit it to the INS 200 shown in FIG. 1 through the transmission line TL123. Although only one function of the LDL module 144, i.e., the electronic to optical conversion function for the digital subscriber information, is disclosed herein, it should be appreciated that another function thereof, e.g., a transfer rate conversion process for the digital subscriber information for the case of great number of subscribers is actually performed therein.

Referring back to FIG. 1, the INS 200 may include a central data link (CDL) module and a space division switching unit (not shown), wherein their operations may be controlled by the CCS 300. As is well known, the CDL module, which may be also implemented with an optical cable and a signal converter (not shown), reconverts the light signal of the digital subscriber information transmitted from the LDL module 144 shown in FIG. 2 back to the electronic signal. The digital subscriber information so reconverted is then sent to the space division switching unit.

The space division switching unit, as is well known, performs to switch the digital subscriber information from the CDL module to a corresponding transmission line (not shown) in space using a conventional space division switching device, wherein the digital subscriber information on the transmission line is then provided back to the CDL module.

The CDL module again converts the electronic signal of the digital subscriber information on the transmission line to the light signal to efficiently transmit the same to a second time division switching unit 520 of the second ASS 500 via a corresponding transmission line TL124.

The second ASS 500 is substantially identical to the first ASS 100 except that the time division switching and the subscriber interfacing operations are processed in reverse order. Therefore, the second ASS 500 includes the second time division switching unit 520 and a second subscriber interfacing unit 540.

Figure 3:
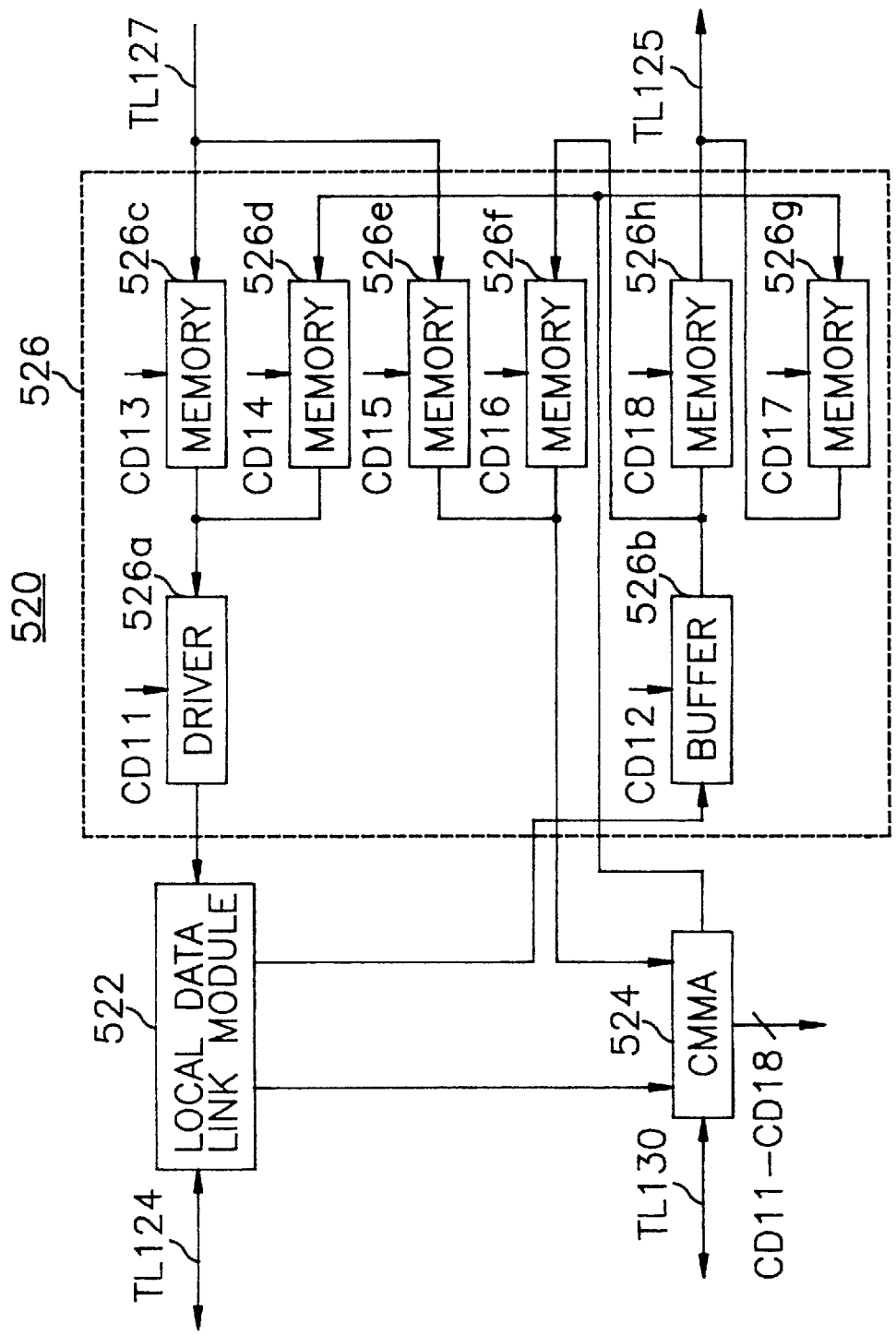
FIG. 3 provides a detailed block diagram of the second time division switching unit shown in FIG. 1.

The second time division switching unit 520, as illustrated in FIG. 3, includes an LDL module 522, a CMMA 524, and a TSL module 526 having a driver 526a, a buffer 526b and six memories 526c to 526h, wherein the CMMA 524 also generates eight control data CD11 to CD18 prestored in a control memory (not shown) thereof to provide each of them to each of the driver 526a, the buffer 526b, and the memories 526c to 526h to control its operation.

Even though the second time division switching unit 520 has the same components as the first time division switching unit 140, it is further drawn to explain more clearly an inventive method for testing the status of each of the set of subscriber components.

Specifically, at the LDL module 522 shown in FIG. 3, the light signal of the digital subscriber information from the CDL on the transmission line TL124 is reconverted back to the electronic signal to send it to the buffer 526b. And then, the buffer 526b temporarily stores the digital subscriber information and provides it to the sixth memory 526h for its storage. The digital subscriber information stored in the memory 526h is sent via a corresponding transmission line TL125 to the second subscriber interfacing unit 540.

Thereafter, at the second subscriber interfacing unit 540, the digital subscriber information provided through the transmission line TL125 is reconverted to the analog subscriber information to transmit the same to the second receiving subscriber via the second subscriber line SL126, thereby enabling communication of information between the first sending subscriber and the second receiving subscriber.

On the other hand, each of the first and the second TEC units 160 and 560 shown in FIG. 1 serves to test the status of each of the set of subscriber components by employing a novel subscriber component status testing method of the present invention which will be described in detail with respect to FIGS. 1 to 3 from then on.

In the inventive subscriber component status testing method, when an operator of the ESS 600 wishes to test the status of the first subscriber interfacing unit 120, a first test selection signal TSS1 generated from a key matrix unit (not shown) included in the ESS 600 is provided to the CCS 300, wherein the CCS 300 issues a first test control signal TCS1 and provides the same to the first subscriber interfacing unit 120, and to either of the first and the second TEC units 160 and 560, e.g., the first TEC unit 160 by the selection of the CCS 300 which always monitors their current operations. In this case, in response to the first test control signal TCS1, the first subscriber interfacing unit 120 is disconnected from the first subscriber line SL121 represented by only one bidirectional line instead of two lines of, i.e., RX and TX, for the sake of simplicity, while the two transmission lines TL122 and TL128 are connected within the first subscriber interfacing unit 120.

Subsequently, the first TEC unit 160, which is responsive to the first test control signal TCS1, retrieves prestored test-pattern data TPD with a predetermined bit length of, e.g., 8-bit, to transmit the same via a transmission line TL129 and the CMMA 146 to the fifth memory 142e of the TSI module 142. The memory 142e stores the test-pattern data TPD for a predetermined time period and outputs the data TPD stored therein to the transmission line TL128 in response to the fifth control data CD5 from the control memory.

And then, the test-pattern data TPD on the transmission line TL128 is relayed to the transmission line TL122 via the first subscriber interfacing unit 120 shown in FIG. 1, wherein the TL128 has already been connected with the line TL122 in response to the first test control signal TCS1 from the CCS 300 as explained above. The test-pattern data TPD on the line TL122 is then sent to the third memory 142c of the TSI module 140 shown in FIG. 2 for its temporary storage. The data TPD stored in the memory 142c is read out in response to the third control data CD3 from the control memory to transmit the same via the transmission line TL129 to the first TEC unit 160 shown in FIG. 1 through the CMMA 146.

At the first TEC unit 160, the data TPD returned through the line TL129 is compared with the original test-pattern data TPD stored therein to check whether or not they are identical. A first status signal SS1 representing the check result is then provided from the first TEC unit 160 to the CCS 300, wherein the status of the first subscriber interfacing unit 120 is determined as normal or erroneous based on the first status signal SS1. For instance, if the two data compared are identical, the signal SS1 is logic low and the first subscriber interfacing unit 120 is determined to be normal; and if otherwise, the signal SS1 is logic high and the same is determined to be erroneous. Finally, the CCS 300 generates information representing the status of the first subscriber interfacing unit 120 and provides it to the display device 400 so that the operator of the ESS 600 can easily recognize the status of the first subscriber interfacing unit 120.

On the other hand, when the operator of the ESS 600 wishes to test the status of the first subscriber line SL121, a second test selection signal TSS2 generated from the key matrix unit is provided to the CCS 300, wherein the CCS 300 outputs a second test control signal TCS2 to the first subscriber interfacing unit 120, and to either one of the first and the second TEC units, 160 and 560, e.g., the first TEC unit 160 by the selection of the CCS 300 which always monitors their current operations. In this case, in response to the second test control signal TCS2, the first subscriber interfacing unit 120 is connected with the first subscriber line SL121, while the two transmission lines TL122 and TL128 are disconnected. Therefore, the RX line of the first subscriber line SL121 is coupled with the TX line thereof at the first sending subscriber.

Thereafter, the first TEC unit 160, which is responsive to the second test control signal TCS2, produces the same test-pattern data TPD prestored therein as explained early to transmit it via the transmission line TL129 and the CMMA 146 to the fifth memory 142e of the TSI module 142. The memory 142e temporarily stores the test-pattern data TPD from the CMMA 146 and outputs the stored data TPD to the transmission line TL128 in response to the fifth control data CD5 from the control memory.

And then, the test-pattern data TPD on the transmission line TL128 is converted to an analog test signal by the first subscriber interfacing unit 120 shown in FIG. 1 to transmit it via the RX line of the first subscriber line TL121 to the first sending subscriber, wherein the analog test signal applied to the first sending subscriber is then relayed to the TX line of the line SL121. Thereafter, the analog test signal on the TX line is sent to the first subscriber interfacing unit 120, wherein the analog test signal is reconverted back to the test-pattern data TPD and is then relayed via the transmission line TL122 to the third memory 142c of the TSI module 142 shown in FIG. 2 for its temporary storage. And then, the data TPD stored in the memory 142c is read out in response to the third control data CD3 from the control memory to provide the same via the transmission line TL129 and the CMMA 146 to the first TEC unit 160 shown in FIG. 1.

At the first TEC unit 160, the data returned back through the transmission line TL129 is compared with the original test-pattern data TPD prestored therein to check whether or not they are identical. A second status signal SS2 representing the check result is then provided from the first TEC unit 160 to the CCS 300, wherein the status of the first subscriber line SL121 is determined as normal or erroneous based on the second status signal SS2. That is, if the two data compared is identical, the second status signal SS2 is logic low and the first subscriber line SL121 is determined to be normal; and if otherwise, the signal SS2 is logic high and the first subscriber line SL121 is determined to be erroneous. Finally, the CCS 300 produces information representing the status of the first subscriber line SL121 and provides it to the display device 400 so that the operator of the ESS 600 can easily perceive the status of the first subscriber line SL121.

When the operator wishes to test the status of the second subscriber interfacing unit 540, a third test selection signal TSS3 generated from the key matrix unit is provided to the CCS 300, wherein the CCS 300 outputs a third test control signal TCS3 to the second subscriber interfacing unit 540, and to either one of the first and the second TEC units 160 and 560, e.g., the first TEC unit 160. In this case, in response to the third test control signal TCS3, the second subscriber interfacing unit 540 is disconnected with the second subscriber line SL126, while the two transmission lines TL125 and TL127 are connected within the second subscriber interfacing unit 540.

Thereafter, in response to the third testing control signal TCS3, the first TEC unit 160 generates the same test-pattern data TPD as explained above to send it via the transmission line TL129 to the second memory 142b of the TSI module 142 through the CMMA 146 shown in FIG. 2. The memory 142b temporarily stores the test-pattern data TPD and retrieves, in response to the second control data CD2 from the control memory, the data TPD stored therein and provides it to the driver 142g to latch.

And then, in response to the seventh control data CD7 from the control memory, the test-pattern data TPD latched at the driver 142g is outputted to send it via the transmission line TL123 to the INS 200 through the LDL module 144, and then to the second time division switching unit 520 through the transmission line TL124 shown in FIG. 1. The LDL module 144 and the INS 200 perform the same processes as mentioned above; and, therefore, their detailed operation descriptions are omitted here for the sake of simplicity.

Subsequently, the data TPD on the line TL124 is provided via the LDL module 522 to the buffer 526b of the TSI module 526 included in the second time division switching unit 520 shown in FIG. 3, wherein the LDL module 522 also operates identically to the LDL module 144 shown in FIG. 2. The buffer 526b stores the test-pattern data TPD and retrieves, in response to the twelfth control data CD12 from the control memory of the CMMA 524, the data TPD stored therein and provides it to the sixth memory 526h for the storage thereof.

In response to the eighteenth control data CD18 from the control memory, the data TPD stored in the memory 526h is read out to send it via the transmission line TL125 to the second subscriber interfacing unit 540 shown in FIG. 1, wherein the line TL125 has been already connected with the line TL127 in response to the signal TCS3 from the CCS 300 as explained above. The data TPD supplied to the second subscriber interfacing unit 540 is then relayed via the line TL127 to the first memory 526c shown in FIG. 3 to store the same for a predetermined time duration. Thereafter, the memory 526c, in response to the thirteenth control data CD13 from the control memory, retrieves the data TPD stored therein and provides it to the driver 526a temporarily latching the data TPD from the memory 526c.

The data TPD latched at the driver 526a is then outputted in response to the eleventh control data CD11 from the control memory to transmit it via the transmission line TL124 to the INS 200 shown in FIG. 1 through the LDL module 522, wherein the LDL module 522 and the INS 200 perform the same processes as described above. And then, the data TPD supplied to the INS 200 is sent via the LDL 144 of the first time division switching unit 140 to the buffer 142h thereof shown in FIG. 2 through the transmission line TL123. Also, the LDL module 144 carries out the same process as explained above.

The buffer 142h temporarily stores the data TPD from the LDL module 144 and outputs, in response to the eighth control data CD8 from the control memory, the data TPD stored therein to relay it to the fourth memory 142d. The memory 142d stores the data TPD from the buffer 142h, and then, in response to the fourth control data CD4 from the control memory, it transmits the data TPD stored therein via the line TL129 to the first TEC unit 160 shown in FIG. 1 through the CMMA 146.

At the first TEC unit 160, the status of the second subscriber interfacing unit 540 is also checked by comparing the data received through the CMMA 146 with the original data stored therein. Thereafter, a third status signal SS3 representing the check result is fed to the CCS 300, wherein the status of the second subscriber interfacing unit 540 is determined as normal or erroneous in a similar manner described above. Information representing the status of the second subscriber interfacing unit 540 is then provided from the CSS 300 to the display device 400 for its visual display.

Finally, a series of processes to test the status of the second subscriber line SL126 are extremely similar to those described with respect to the first subscriber line SL121 and the second subscriber interfacing unit 540; and, therefore, detailed description therefor is omitted herein for the sake of simplicity.

Even though a method to test the status of each of the set of subscriber components employing the second TEC unit 560 contained in the second ASS 500 is omitted herein for the sake of simplicity, it should be apparent to those skilled in the art that their respective status can be easily tested through the use of the corresponding methods as described above. Further, as explained above, it should be noted that the inventive subscriber component status testing algorithm can be used only when the two subscribers illustrated above are not communicated with each other or other subscribers and the remaining components within the ESS 600 other than the set of subscriber components are all normal.

While the present invention has been shown and described with respect to the particular embodiments, it will be apparent to those skilled in the art that many changes and modifications may be made without departing from the spirit and scope of the invention as defined in the appended claims.

What is claimed is:

1. An improved electronic switching system (ESS) for connecting a sending subscriber and its corresponding receiving subscriber among a plural number of subscribers, which comprises:

first interfacing means connected to the sending subscriber for converting analog subscriber information transmitted from the sending subscriber via a first subscriber line to digital subscriber information to provide it to a first transmission line;

second interfacing means connected to the corresponding receiving subscriber for reconverting the digital subscriber information on the first transmission line to the original analog subscriber information to transmit the same to the corresponding receiving subscriber via a second subscriber line;

switching means coupled between the first and the second interfacing means for switching the digital subscriber information on the first transmission line to the second interfacing means, wherein said switching means is operated by utilizing a time division switching unit having a time slot interchanging unit and a space division switching unit, said time slot interchanging unit having first memory for interfacing the digital subscriber information from the first interfacing means to the space division switching unit; second memory for interfacing test-pattern data from a testing means to the space division switching unit; third memory for interfacing the test-pattern data from the first interfacing means to the testing means; fourth memory for interfacing the test-pattern data from the space division switching unit to the testing means; and fifth memory for interfacing the test-pattern data from the testing means to the first interfacing means; and testing means connected to the switching means, if the remaining components within the system excepting the first and the second subscriber interfacing units are all normal, for testing the status of each of a set of subscriber components to provide information representing the status thereof wherein the set of subscriber components is the first and the second subscriber interfacing means, and the first and the second subscriber lines.

2. The system in accordance with claim 1, wherein said testing means includes:

generation means, in response to a control signal issued from a controller of the system when an operator of the system wishes to test the status of each of the set of subscriber components, for generating test-pattern data with a predetermined bit length to transmit it to said each of the set; and receiving and comparison means for receiving the test-pattern data from said each of the set and for comparing the received test-pattern data with the original test-pattern data to determine the status of said each of the set, wherein the status thereof is considered to be normal if the received test-pattern data is equal to the original test-pattern data; and erroneous if otherwise.

3. The system in accordance with claim 1, further comprising means for displaying the information provided from the testing means.

* * * * *